US007729239B1

(12) United States Patent
Aronov et al.

(10) Patent No.: US 7,729,239 B1
(45) Date of Patent: Jun. 1, 2010

(54) PACKET SWITCHING NETWORK END POINT CONTROLLER

(75) Inventors: Alexander Y. Aronov, Framingham, MA (US); Stephen D. MacArthur, Northborough, MA (US); Michael Sgrosso, Franklin, MA (US); William F. Baxter, III, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 939 days.

(21) Appl. No.: 11/022,998

(22) Filed: Dec. 27, 2004

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)
*H04L 12/54* (2006.01)

(52) U.S. Cl. .............. 370/229; 370/395.21; 370/395.4; 370/428

(58) Field of Classification Search ............ 370/395.21, 370/428, 389, 395.41, 395.42, 395.43, 395.4, 370/FOR. 112, 229–231, 419, 422, 351–356, 370/360, 412, 413
See application file for complete search history.

(56) References Cited

U.S. PATENT DOCUMENTS

| 5,610,661 | A  | * | 3/1997  | Bhatt          | 348/446 |
| 5,761,207 | A  | * | 6/1998  | Kimura         | 370/524 |
| 6,606,326 | B1 | * | 8/2003  | Herring        | 370/412 |
| 6,928,073 | B2 | * | 8/2005  | Jones et al.   | 370/389 |
| 7,142,536 | B1 | * | 11/2006 | Gossett et al. | 370/360 |
| 7,231,492 | B2 | * | 6/2007  | Baxter, III    | 711/113 |
| 7,298,738 | B1 | * | 11/2007 | Parruck et al. | 370/360 |
| 2002/0118692 | A1 | * | 8/2002 | Oberman et al. | 370/419 |

(Continued)

OTHER PUBLICATIONS

DiNucci, David C., "A Formal Model For Architecture-Independent Parallel Software Engineering", Oregon Graduate Institute, published Mar. 1990, retrieved on Aug. 31, 2008 from http://www.elepar.com/Passworded/91-th-00.pdf.*

(Continued)

*Primary Examiner*—Kevin C Harper
*Assistant Examiner*—Xavier Szewai Wong (57) ABSTRACT

An end point controller includes two of ingress/egress port pairs. A first one of the ingress/egress ports is adapted to send and receive one of a pair of types of information packets and a second one of the ingress/egress ports is adapted to send and receive the other one of the pair of types of information packets. A controller is coupled to the two port pairs for coupling one of ingress/egress ports to an input/output port selectively in accordance with the type of the information packet on the ingress/egress ports and the availability of the end point controller to a network. One of the egress ports is directly coupled to the output port to the network if the information packet is at such port and the end point controller has been granted access to the network while other information at the pair of egress ports is buffered prior to being coupled to the output. In like fashion, the input port from the network is directly coupled to one of the ingress ports if the information packet is of the type of information packet destined for such ingress port, said port being available to transmit the packet.

4 Claims, 9 Drawing Sheets

U.S. PATENT DOCUMENTS

| | | | | |
|---|---|---|---|---|
| 2003/0161303 A1* | 8/2003 | Mehrvar et al. | ............. | 370/386 |
| 2004/0085964 A1* | 5/2004 | Vaananen | ................ | 370/395.4 |
| 2004/0114536 A1* | 6/2004 | O'Rourke | ................... | 370/252 |
| 2004/0252672 A1* | 12/2004 | Nemazie | ..................... | 370/351 |
| 2005/0220011 A1* | 10/2005 | Parker et al. | ................ | 370/229 |

OTHER PUBLICATIONS

Bruening U, Giloi W. K., Schroeder-Preikscha W., "Latency Hiding in Message-Passing Architectures", IEEE Parallel Processing Symposium, 1994. Proceedings., Eighth International, p. 704-709; Published Apr. 26-29, 1994; retrieved on Aug. 31, 2008 from http://ieeexplore.ieee.org/xpl/freeabs_all.jsp?arnumber=288227.*

Roberto Innocente, Olumide Sunday Adewale; "Virtual Interface Architecture Draft Write-Up", available on Nov. 12, 2003, retrieved on Aug. 31, 2008 from http://people.sissa.it/~inno/pubs/innocente_adewale.pdf.*

* cited by examiner

PACKET SWITCHING NETWORK END POINT CONTROLLER

TECHNICAL FIELD

This invention relates generally to packet switching networks and more particularly to end point controllers used in such networks.

BACKGROUND

As is known in the art, packet switching networks, or switching fabrics, are used in a wide variety of applications to transfer information to one or more of a plurality of devices located at various nodes of the network. The device sending the information is sometimes referred to as the source node and the device receiving the information is sometimes referred to as the destination node, or target.

The destination node's physical layer normally stores the received packet of information into a queue, or buffer, (e.g., a store and forward queue) for processing by the destination node's processing logic. The destination node's physical layer normally treats all incoming packets the same and has no knowledge or understanding of the packet contents.

In some applications, the devices transmit and hence receive two types of independently generated information. In many applications of such type, it is desirable to transmit through the network one type of information faster (i.e., with lower latency) than the other type of information.

SUMMARY

In accordance with the present invention, an end point controller is provided having a pair of device connections. Each one of the device connections includes an ingress port and an egress port. A first one of the pair, of device connections is adapted to transmit and receive one of a pair of types of information packets having certain service time requirements. A second one of the pair of device connections is adapted to transmit and receive the other one of the pair of types of information packets having different service time requirements. Each of said ingress and egress ports operates independently and may transmit packets at the same time.

In one embodiment an end point controller includes a pair of egress ports, a first one of the pair of egress ports being adapted to transmit one of a pair of types of information packets having certain service time requirements and a second one of the pair of egress ports being adapted to transmit the other one of the pair of types of information packets having different service time requirements. One of the pair of egress ports is directly coupled to an output if the information packet is at such port and the end point controller has been granted access to the network while other information for coupling to the output at the other one of the pair of egress ports is buffered prior to being coupled to the output.

In one embodiment, an end point controller includes a pair of ingress ports, a first one of the pair of ingress ports being adapted to receive one of a pair of types of information packets having certain service time requirements and a second one of the pair of ingress ports being adapted to receive the other one of the pair of types of information packets having different service time requirements. One of the pair of ingress ports is directly coupled to an input if the information packet is at such port while other information for coupling to the input at the other one of the pair of ingress ports is buffered prior to being coupled to the input.

In one embodiment, an end point controller is provided for a packet switching network. The network is coupled to a node through the end point controller. The node is adapted to transmit independently to the network two different types of information packets, and to receive such two different types of information packets from the network. The end point controller includes an I/O port connected to the network for transmitting and receiving both of the types of information packets to and from the network, respectively.

The portion of the end point controller responsible for transferring packets from the device to the network (i.e., an egress path) manages the two egress ports for the coupling of one of the egress ports for output to the network. A first one of the egress ports is adapted to receive one of the pair of types of information packets, usually associated with high throughput, transmitted in a store and forward manner. The second one of the egress ports is adapted to receive the other one of the pair of types of information packets, usually associated with shortest possible service time, supported by low latency paths. Also provided are a low latency buffer, a store and forward buffer, and a multiplexer. The low latency buffer serves both as temporary storage for low latency packets in the event of I/O egress port 38 unavailability and as a temporary copy for transmitted low latency packets awaiting acknowledgement. The multiplexer includes: a first input connected to the first one of the pair of egress ports through the low latency buffer; a second input connected to the first one of the pair of egress ports through a path by-passing the low latency buffer; a third input connected to the second one of the pair of egress ports through the store and forward buffer; and a fourth input for use by the end point controller to issue network flow control information. The multiplexer is used to select packets to be presented to the network. Selection of the multiplexer is made upon availability of the network output. The one of the inputs is selected in accordance with the availability of packets in the low latency buffer. The second one of the inputs is selected if an information packet is being received for transmission to the network by the end point controller on the first one of the pair of egress inputs. The third one of the inputs is selected in accordance with the availability of packets in the store and forward buffer. The fourth one of the inputs is selected in accordance with the availability of flow control information to be issued.

The portion of the end point controller responsible for transferring packets from the network to the device (i.e., an ingress path) couples the network input to one of the two ingress ports. The input is directly coupled to the first one of the ingress ports selectively with the type of the information packet presented by the network, prior received packets intended for but not yet sent to that ingress port, and the availability of that ingress port. A first one of the ingress ports is adapted to receive one of the pair of types of information packets and a second one of the ingress ports is adapted to receive the other one of the pair of types of information packets. Also provided are a single shared buffer capable of containing either of the pair of types of information packets, and a multiplexer. The shared buffer enables the use of a simple single-point buffer credit based flow control at the I/O network connection while efficiently supporting the two independent device connections. The output of the multiplexer connects to the first of the ingress ports. The multiplexer includes: a first input connected to the shared buffer; and a second input connected to the network input port through a path by-passing the shared buffer. The controller monitors the network input for coupling a selected one of the ingresses to the network input port. Store and forward packets are always sent through the shared buffer to the second ingress port. Low latency packets are selected to be either placed in the shared buffer or presented directly on the by-pass path in accordance with the availability of the low latency ingress port and the lack of previously received low latency packets still remaining in the shared buffer. In the event of previously received low latency packets still remaining in the shared buffer, newly arrived low latency packets may also be placed in the shared buffer such that upon availability of the low latency ingress port their order of presentation to that ingress port can be controlled.

With such an arrangement, the end point controller servicing a single network connection provides mechanisms for the physical layer to distinguish between types of packets, specifically short service time control information packets and high throughput data information packets, and steers the control information packets into a low latency control path sometimes referred to as a bypass or cut-though path, and steers data information packets into a store and forward queue, or buffer. The result is that control information packets are sent to the nodes processing logic much faster then if there had been a single store and forward queue while not interfering with the normal flow of the data information transfer between the device and the end point controller. Control information packets thereby are processed sooner, allowing for higher performance operation of the system.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
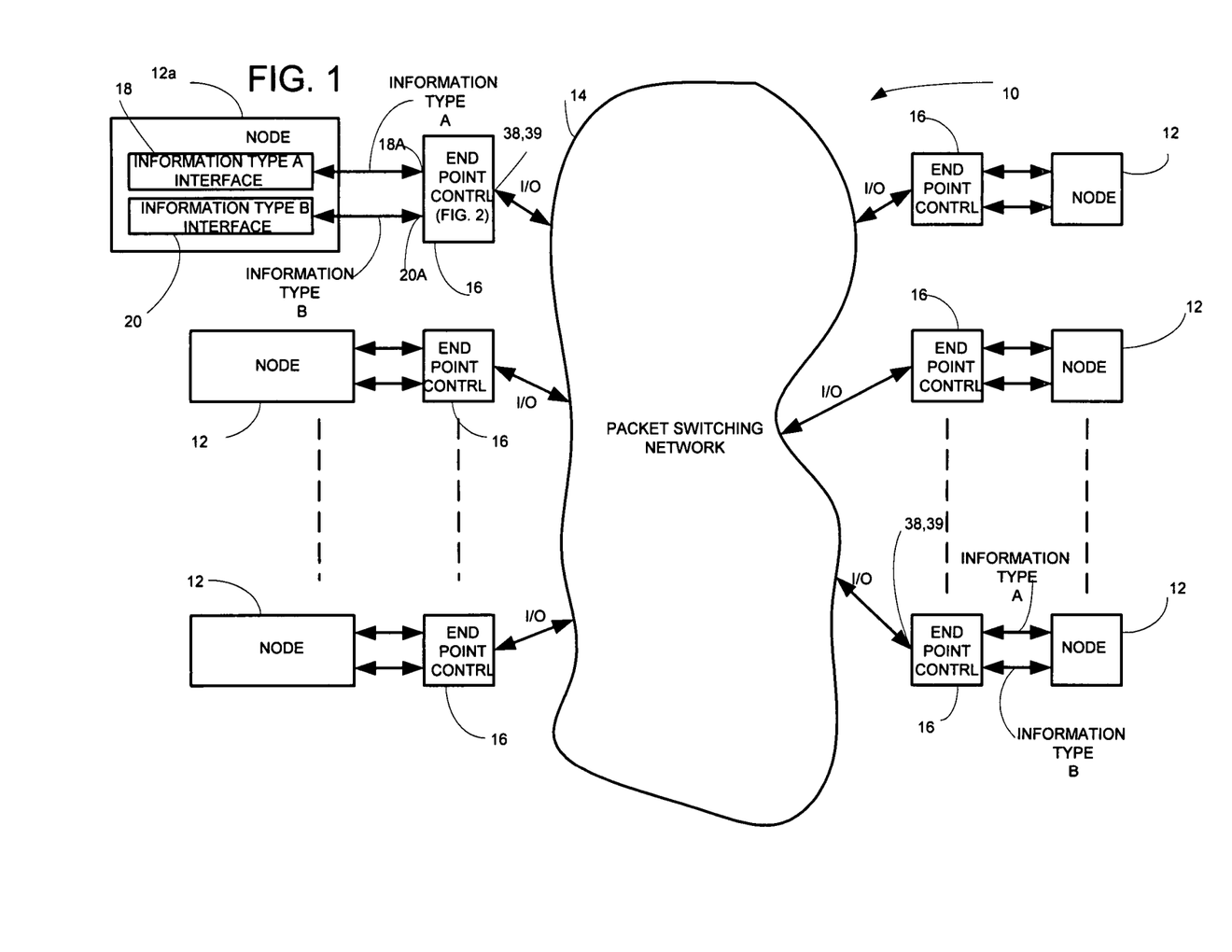
FIG. 1 is a is a diagram of a packet switching system according to the invention.

Referring now to FIG. 1 invention, system 10 is shown having a plurality of nodes 12, each one of the nodes 12 being coupled to a packet switching network 14 through a corresponding one of a plurality of end point controllers 16. Each one of the nodes 12 is adapted to transmit independently to the fabric switching network 14 two different types of information packets. Here, one type of information packet, having certain service time requirements, is here referred to as INFORMATION TYPE A and the other type of information packet, having different service time requirements, is here referred to as INFORMATION TYPE B. The nodes 12 are identical in construction and an exemplary one thereof, here labeled 12a, is shown to include a INFORMATION TYPE A interface 18 for transmitting and receiving the INFORMATION TYPE A information packets and a INFORMATION TYPE B interface 20 for transmitting and receiving the INFORMATION TYPE B information packets. As noted above, each one of the nodes 12 is adapted to transmit independently to the packet switching network 14 the INFORMATION TYPE A information packets and the INFORMATION TYPE B information packets. That is, the INFORMATION TYPE A interface 18 and the INFORMATION TYPE B interface 20 operate independently of one another. Thus, INFORMATION TYPE A information passes to and from the INFORMATION TYPE A interface 18 via a bidirectional INFORMATION TYPE A bus and control passes to and from the INFORMATION TYPE B interface 20 via a bi-directional INFORMATION TYPE B bus. Each bus is comprised of a pair of point-to-point uni-directional packetized paths configured for bi-directional communications. The two directions are independent and may operate in parallel. Thus, INFORMATION TYPE A bus is connected to device connection 20A and INFORMATION TYPE B bus is connected to device connection 18A. INFORMATION TYPE A interface 18 is connected to device connection 18A of the end point controller 16 and INFORMATION TYPE B interface 20 is connected to device connection 20A of the end point controller 16.

As noted above, each one of the nodes 12 is coupled to the fabric switching network 14 though a corresponding one of a plurality of the end point controllers 16. Each one of the end point controllers 16 is coupled to the fabric switching network 14 through a bi-directional I/O bus. Each one of the end point controllers 16 can but is not required to be made identical in construction, an exemplary one thereof, here the end point controller labeled 16a is shown in detail in FIG. 2.

Figure 2:
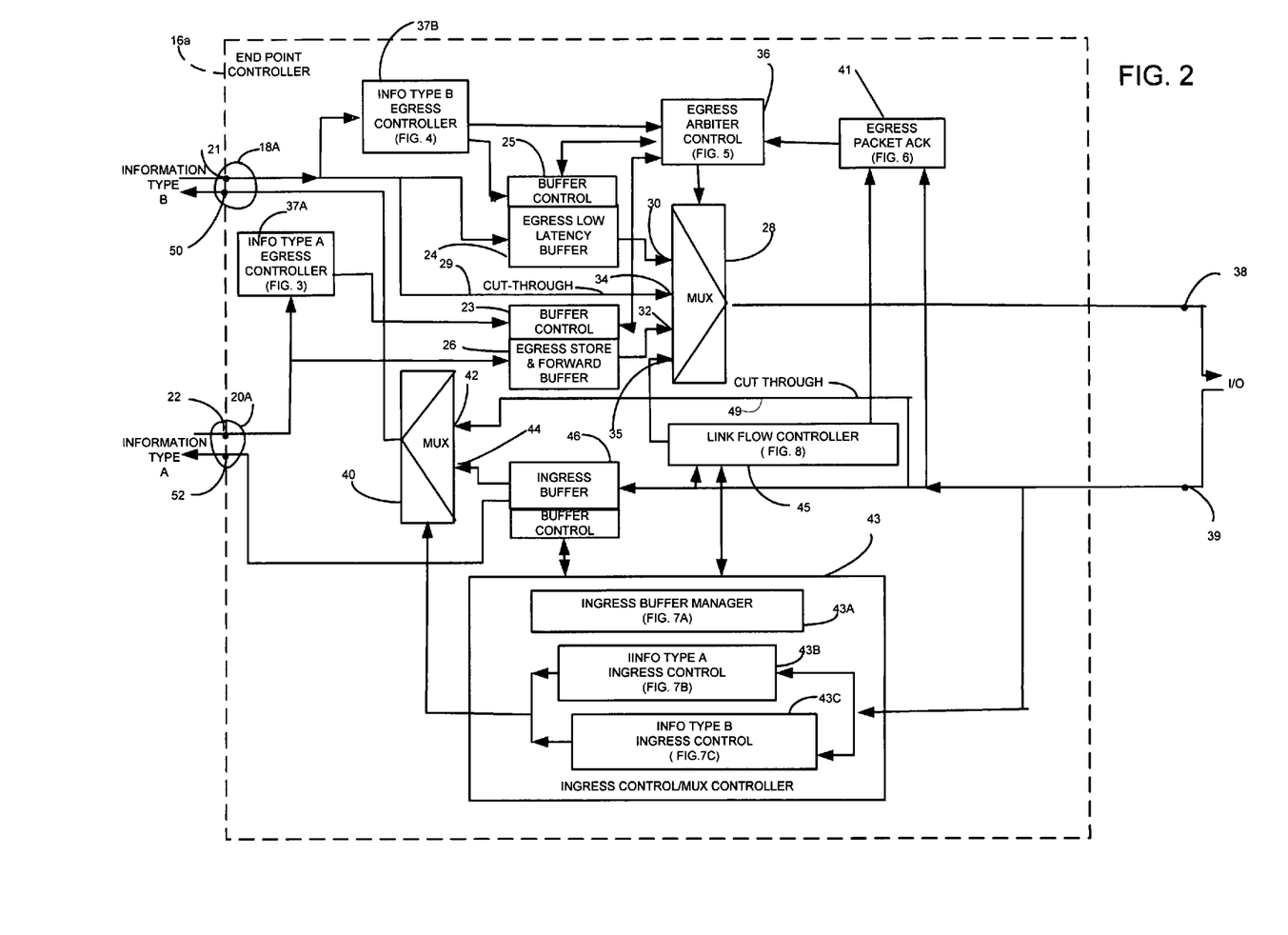
FIG. 2 is a block diagram of an exemplary one of a plurality of end point controllers according to the invention used in the system of FIG. 1.

Thus, referring now to FIG. 2, the exemplary end point controller 16a is shown to include a pair of egress ports 21, 22; i.e., a INFORMATION TYPE A egress port 22 adapted to receive INFORMATION TYPE A information packets from the INFORMATION TYPE A interface 18 (FIG. 1) of node 12a and a INFORMATION TYPE B egress port 21 is adapted to receive information packets from the INFORMATION TYPE B interface 20 of INFORMATION TYPE B interface 20 of node 12a. Thus, device connection 18A includes an egress port 21 and an ingress port 50 connected to INTERFACE TYPE A interface 18 (FIG. 1) and device connection 20A includes an egress port 22 and an ingress port 52 connected to INTERFACE TYPE B interface 20 (FIG. 1). As noted above, the end point controller 12a includes an I/O port connected to the network 14 (FIG. 1) for transmitting and receiving both INFORMATION TYPE A type and INFORMATION TYPE B type information packets to and from the network 12. More particularly, the end point controller 16a includes an egress port 38 of the I/O port for transmitting both INFORMATION TYPE A type information packets or INFORMATION TYPE B type information packets to the network 14, FIG. 1.

The end point controller 16a also includes an ingress INFORMATION TYPE B port 50 and an ingress INFOR- MATION TYPE A port 52. The ingress INFORMATION TYPE B port 50 is connected to the INFORMATION TYPE B interface 20, FIG. 1, and the ingress INFORMATION TYPE A port 52 is connected to the INFORMATION TYPE A interface 18 of node 12*a*. The end port controller 16*a* includes an ingress port 39 of the I/O bus for receiving both INFORMATION TYPE A type information packets from the network 14, FIG. 1, and INFORMATION TYPE B type information packets from such network 14.

The ingress port 39 is connected to input port 44 of multiplexer 40 through an ingress buffer 46 and is connected directly to input port 42 via a CUT THROUGH path 49 that by-passes the ingress buffer 46, as shown. One of the inputs 42, 44 is coupled to the ingress INFORMATION TYPE B port 50 selectively in accordance with a control signal fed to the multiplexer 42 by ingress control/mux controller 43 in a manner to be described in more detail below. The ingress buffer 46 output is coupled to ingress INFORMATION TYPE A port 52, as shown. Thus, as will be described in more detail in connection with FIGS. 7A, 7B and 7C, INFORMATION TYPE A type information packets at ingress port 39 of the I/O bus passes to the INFORMATION TYPE A interface 18 of node 12*a* via the ingress INFORMATION TYPE A port 52 while INFORMATION TYPE B type information packets at ingress port 39 of the I/O bus passes to the INFORMATION TYPE B interface 18 of node 12*a* via the ingress INFORMATION TYPE B port 50.

Still referring to FIG. 2, the exemplary end point controller 16*a* includes an egress low latency buffer 24, a store and forward buffer 26, and an egress multiplexer 28. The multiplexer 28 includes: a first input 30 connected to the INFORMATION TYPE B egress port 21 through egress low latency buffer 24; a second input 34 connected to the INFORMATION TYPE A egress port 22 through the egress store and forward buffer 26; a third input 34 connected directly to the INFORMATION TYPE B egress port 21 through a path CUT-THROUGH 29 which path by-passes the egress low latency buffer 24; and a fourth input port 35 coupled to a link flow controller 45, to be described in detail in connection with FIG. 8. Suffice it to note here that the third input port 34 of the multiplexer 28 is here directly connected to egress port 21, as shown.

The exemplary end point controller 16*a* includes an egress arbiter controller 36, coupled to the egress port 21, through an INFORMATION TYPE B controller 37B, to be described in more detail in connection with FIG. 4) The egress arbiter controller 36 is also coupled to both the egress low latency buffer control 25 and the egress store and forward buffer control 23. Additional information is presented by the link flow controller 45. Information from these four sources is used for providing a control signal to multiplexer 28 to thereby enable such multiplexer 28 to couple a selected one of the inputs 30, 32, 34, or 35 to the egress port 38 of the I/O bus. The one of the inputs 30, 32, 34, or 35 is selected in accordance the type of the information packets in the pair of egress buffers 24, 26 in combination with current activity on port 21, and the availability of the end point controller 16 to the network 14 (FIG. 1). The third one of the inputs 34 is selected if an information packet received for transmission by the end point controller 16*a* is on the INFORMATION TYPE B egress input 21, there are no packets in the low latency buffer 24 that have yet to be presented for transmission that must precede the information packet on port 21, and the end point controller 16*a* has been granted access to the network 14.

The end point controller also includes: an INFORMATION TYPE A controller 37A, to be described in more detail in connection with FIG. 3; the INFORMATION TYPE B controller 37B, mentioned above and to be described in more detail in connection with FIG. 4; an egress packet acknowledger 41, to be described in more detail in connection with FIG. 6; and the ingress control/mux controller 43 mentioned above and to be described in more detail in connection with FIGS. 7A, 7B and 7C; the ingress buffer 46 and the multiplexer 40 all arranged as shown.

Figures 3, 4:
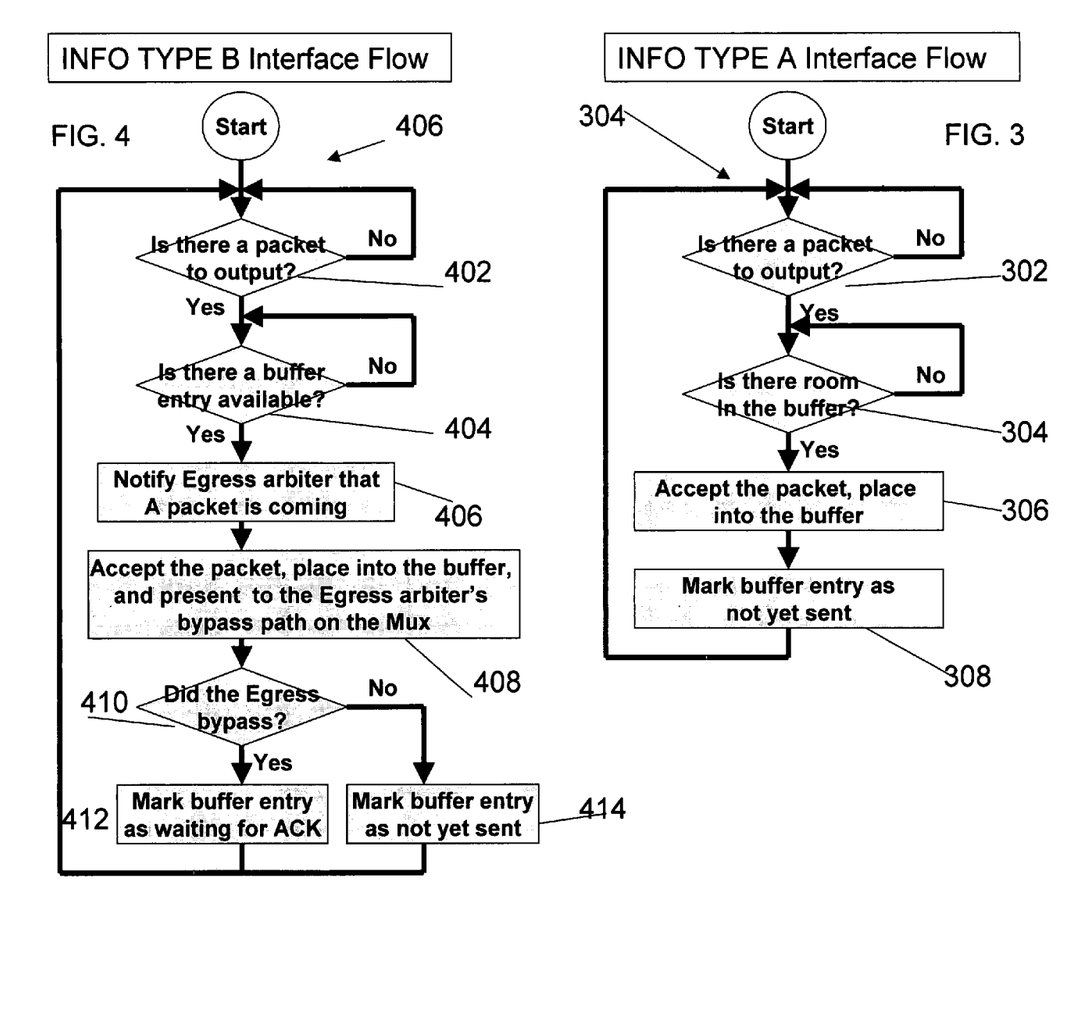
FIG. 3 is a flow diagram of a store and forward controller used in the end point controller of FIG. 2 for controlling one of a pair of different types of information packets fed to such end point controller.
FIG. 4 is a flow diagram of a low latency controller used in the end point controller of FIG. 2 for controlling the other of a pair of different types of information packets fed to such end point controller.

More particularly, referring also to FIG. 3, the INFORMATION TYPE A interface flow control provided by INFORMATION TYPE A interface controller 37A is shown. Thus, as demonstrated in the flow shown in FIG. 3, the controller 37A (FIG. 2) operates the buffer control 23 for the egress store and forward buffer 26. More particularly, the INFORMATION TYPE A interface, determines whether there is a packet at the INFORMATION TYPE A available at port 22 (FIG. 2), STEP 302. If there is a packet at INFORMATION TYPE A port 22, the controller 37A determines whether the egress store and forward buffer 26 has room for storage of the INFORMATION TYPE A packet, STEP 304. If there is room in the egress store and forward buffer 26, the INFORMATION TYPE A packet is stored in the egress store and forward buffer 26, STEP 306 and the controller 37A marks that the INFORMATION TYPE A packet has been stored but has not yet been sent to the egress port 38 of the I/O bus for transmission to the network 14, STEP 308.

Figure 5:
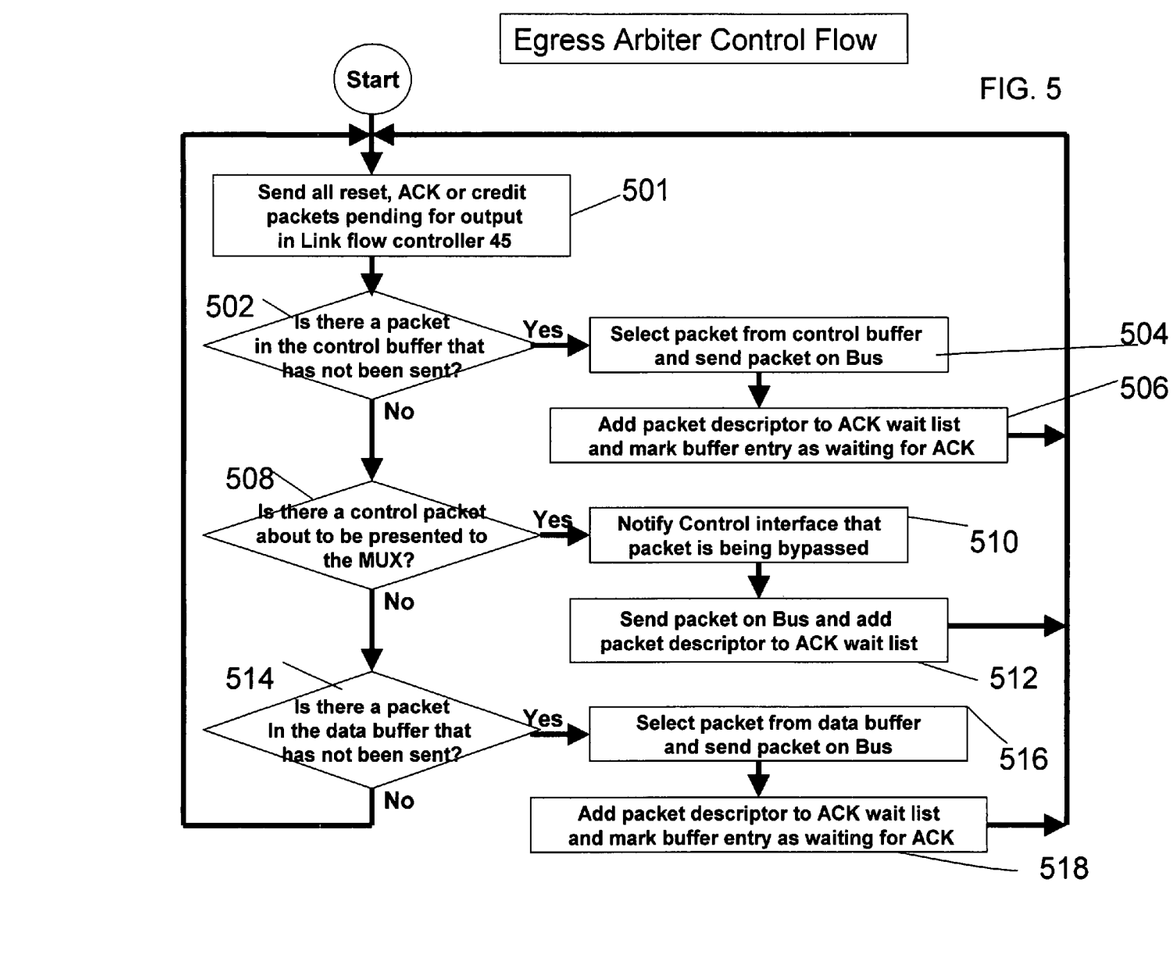
FIG. 5 is a flow diagram of an arbiter used in the end point controller of FIG. 2.

Referring now to FIG. 4, the INFORMATION TYPE B interface flow control provided by INFORMATION TYPE B interface controller 37B is shown. Thus, as demonstrated in the flow shown in FIG. 4, the controller 37B (FIG. 2) operates the buffer control 25 for the egress low latency buffer 24. More particularly, the INFORMATION TYPE A interface controller 37B (FIG. 2) in STEP 402 determines whether there is a packet at the INFORMATION TYPE B port 21 (FIG. 2). If there is a packet at INFORMATION TYPE B port 21, the controller 37B determines whether the egress low latency buffer 24 has room for storage of the INFORMATION TYPE B packet, STEP 404. If there is room in the egress low latency buffer 24, the controller 37B notifies the egress arbiter controller 36 (FIG. 2) that an INFORMATION TYPE B packet is being received, STEP 406. Next, the controller 37B accepts the INFORMATION TYPE B packet and stores it in the egress low latency buffer 24, and presents the packet to the multiplexer 28 CUT-THROUGH port 34, STEP 408. Next, the controller 37B determines whether the INFORMATION TYPE B packet passed to the egress port 38 of the I/O bus via the CUT-THROUGH port 34, Step 410. If the INFORMATION TYPE B packet passed to the egress port 38 of the I/O bus, the controller 37B instructs the low latency buffer control 25 to mark the INFORMATION TYPE B packet as waiting for an acknowledgment from the I/O ingress port 39. STEP 412. It should be noted that the acknowledge can be at the I/O link level On the other, if the INFORMATION TYPE B packet has not been bypassed to the egress port 38 of the I/O bus the controller 37B, i.e., the egress port 38 of the I/O bus is busy, the controller 37B instructs the low latency buffer control 25 to mark the INFORMATION TYPE B packet as having been stored in the egress low latency buffer 24 but not yet sent to the egress port 38 of the I/O bus for transmission to the network 14, STEP 414. Referring now to FIG. 5, the egress arbitration flow process for egress arbiter controller 36 is (FIG. 2) is shown. The egress arbiter controller 36, before selecting a packet for transmission will transmit any flow control information pending in the link flow controller 45, STEP 501. More particularly, the egress arbiter controller 36 sends reset, ACK or credit packets pending for output in Link flow controller 45.

The egress arbiter controller 36 determines whether there is a INFORMATION TYPE B packet in the egress low latency buffer 24 (FIG. 2) that has not been sent to the network 14 (FIG. 1) via the egress port 38 of the I/O bus, and has been determined that it must be transmitted prior to any new packet presented on the egress port 21, STEP 502. If there is one or more INFORMATION TYPE B packets in the low latency buffer 24, the egress arbiter controller 36 selects the next INFORMATION TYPE B packet from the egress low latency buffer 24 and sends such selected INFORMATION TYPE B packet to the egress port 38 of the I/O bus, STEP 504. Next, the egress arbiter controller 36 adds a packet descriptor to the acknowledgments (ACK) wait list that resides in the egress packet acknowledger 41, and instructs the low latency buffer control 25 to mark the packet as waiting for an acknowledgment (ACK), Step 506. These acknowledgements (ACKs) are provided by the egress packet acknowledger 41, described in more detail in FIG. 6.

On the other hand, if there is no INFORMATION TYPE B packet in the low latency buffer 24 that must be sent to the network 14 (FIG. 1) via the egress port 38 of the I/O bus as determined in STEP 502, the egress arbiter controller 36 determines whether there is a INFORMATION TYPE B packet about to be presented to the CUT-THROUGH input 34 of the multiplexer 28, STEP 508. If there is an INFORMATION TYPE B packet about to be presented to the input 34 of the multiplexer 28, the egress arbiter controller 36 notifies the INFORMATION TYPE B interface controller 37B that the INFORMATION TYPE B packet is being CUT-THROUGH directly to the egress port 38 of the I/O bus STEP 510. Next, the egress arbiter controller 36 sends the INFORMATION TYPE B packet to the egress port 38 of the I/O bus and adds a packet descriptor to the acknowledgments (ACK) wait list that resides in the egress packet acknowledger 41, and instructs the low latency buffer control 25 to mark that it is waiting for an acknowledgment (ACK), Step 512.

On the other hand, if, in STEP 508 it is determined that there is not a INFORMATION TYPE B packet about to be presented to the input 34 of the multiplexer 28, the egress arbiter controller 36 determines whether there is a INFORMATION TYPE A packet in the egress store and forward buffer 26 that has not been sent to the egress port 38 of the I/O bus, STEP 514. If there is an INFORMATION TYPE A packet in the egress store and forward buffer 26 that has not been sent to the egress port 38 of the I/O bus, the egress arbiter controller 36 selects a INFORMATION TYPE A packet from egress store and forward buffer 26 and sends the INFORMATION TYPE A packet to the egress port 38 of the I/O bus via multiplexer 28, STEP 516 and adds a packet descriptor to the acknowledgments (ACK) wait list that resides in the egress packet acknowledger 41, and instructs the low latency buffer control 25 to mark that it is waiting for an acknowledgment (ACK), Step 518.

As a last check, the egress arbiter controller 36 will query the link flow controller 45 via the egress packet acknowledger 41 if there are any flow control packets for transmission STEP 520. If such packets are waiting for transmission, the egress arbiter controller will select the input 35 of the egress multiplexer 28 and send such packets to the egress port 38 of the I/O bus STEP 522.

Figure 6:
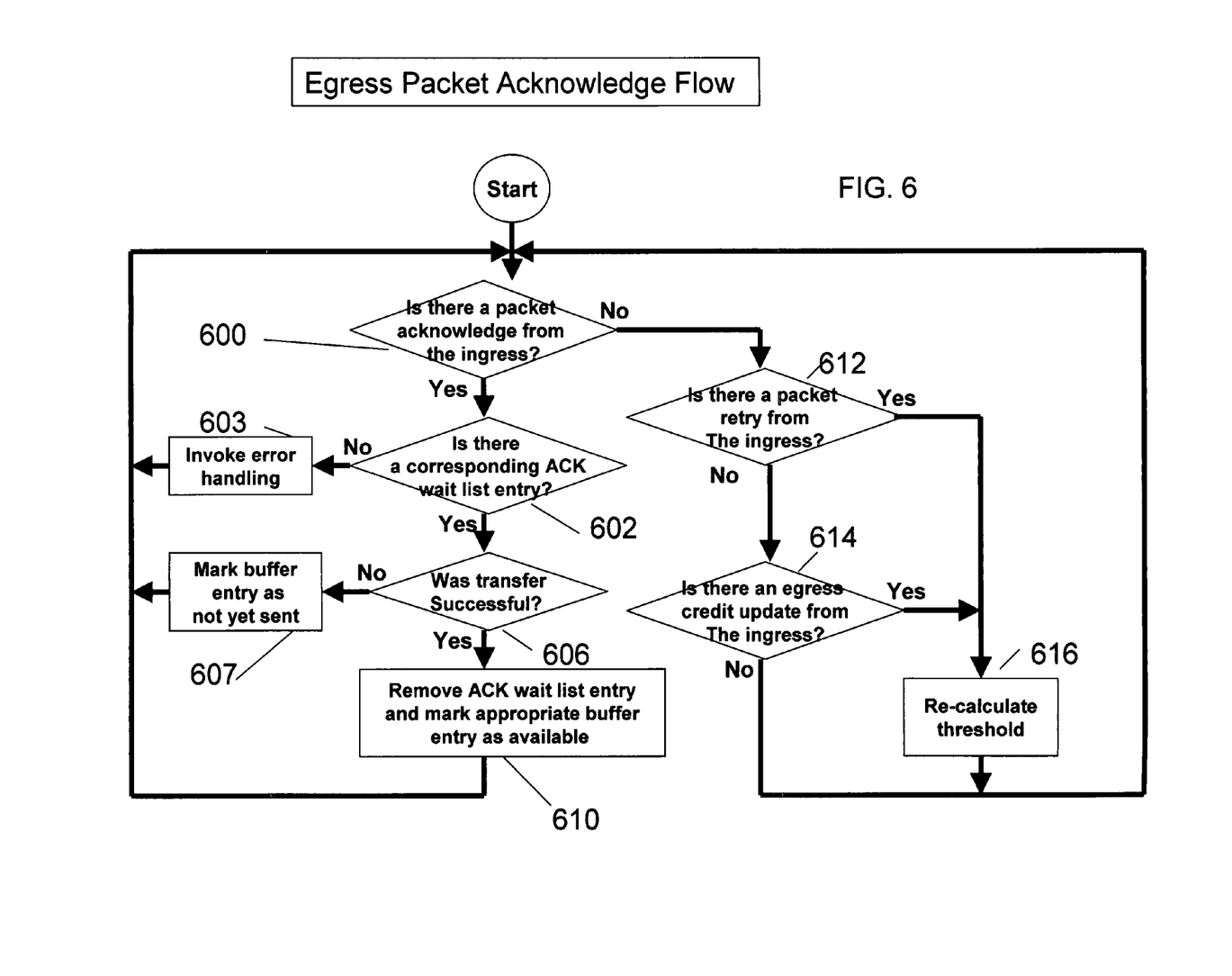
FIG. 6 is a flow diagram of egress packet acknowledgement used in the end point controller of FIG. 2.

Referring now to FIG. 6, the process for egress packet acknowledgement (ACK) provided by egress packet acknowledger 41 is shown. The acknowledger 41 monitors the I/O ingress port 39 to identify transmitted packet acknowledges, indicating either success or failure of the I/O egress packet transfers. In addition, the egress packet acknowledger 41 monitors the I/O ingress port 39 to identify and process flow control information, either retry indications or buffer credit updates.

It is first noted that there are two types of link level packet flow control: receiver based flow control and an initiator, based flow control. In this context the receiver refers to the entity directly connected to the I/O egress port 38 (FIG. 2). It is also noted that the receiver has only a limited number of slots for packet storage. When operating in initiator based flow control, the number of available slots is indented by a number of credits, communicated from the receiver to the initiator. With initiator based flow control, the initiator speculatively transmits a packet to the receiver. The receiver in turn advises the initiator to retry if the receiver is not able or does not wish to receive the packet sent to it by the initiator, i.e., if the receiver is not ready or does not want the packet sent to it by the initiator the receiver replies by sending the initiator a retry. The retry may be sent by the receiver if the priority indication appended to the packet sent by the initiator is a priority lower than that desired by the target in view of the available storage at the target. With initiator based flow control the receiver informs the initiator as to the number of available packet storage slots, i.e., the number of credits. The initiator then determines the packet and number of packets to be sent to the receiver.

Thus, referring to FIG. 6, in STEP 600 the acknowledger 41 monitors the I/O ingress port 39 for a packet acknowledgment resultant from a prior transmission on I/O egress port 38.

If there is a packet acknowledgement, the egress packet acknowledger 41 determines whether there is a corresponding ACK wait list entry for this packet, STEP 602. If not, the egress packet acknowledger 41 invokes an error handling and recovery process; STEP 603; otherwise the egress packet acknowledger 41 determines whether the transfer was successful, STEP 606. If the transfer was not successful, egress packet acknowledger 41 marks the entry as not yet sent STEP 607 so it will be scheduled for re-transmission; otherwise, if the transfer was successful, the egress packet acknowledger 41 removes the ACK wait list entry and informs the egress arbiter control 36 to mark the appropriate low latency or store and forward buffer entry as available STEP 610. The process then returns to STEP 600.

On the other hand, if in STEP 600 there is not a packet acknowledgement, the acknowledger 41 determines whether there is a packet retry on I/O ingress port 39 resultant from on I/O ingress port 39, STEP 612. If there is, the acknowledger 41 re-calculates the credit threshold, STEP 616, and the process returns to STEP 600. On the other hand, if in STEP 612, the acknowledger 41 determines that here is a not a packet retry on the I/O ingress port 39 in STEP 612, and there is no credit update being presented by the I/O ingress port 39, the process returns to STEP 600. If, however, the acknowledger determines that there is a credit update being presented on the I/O ingress port 39, STEP 614, the acknowledger 41 re-calculates the credit threshold, STEP 616, and the process then returns to STEP 600.

Figure 7A:
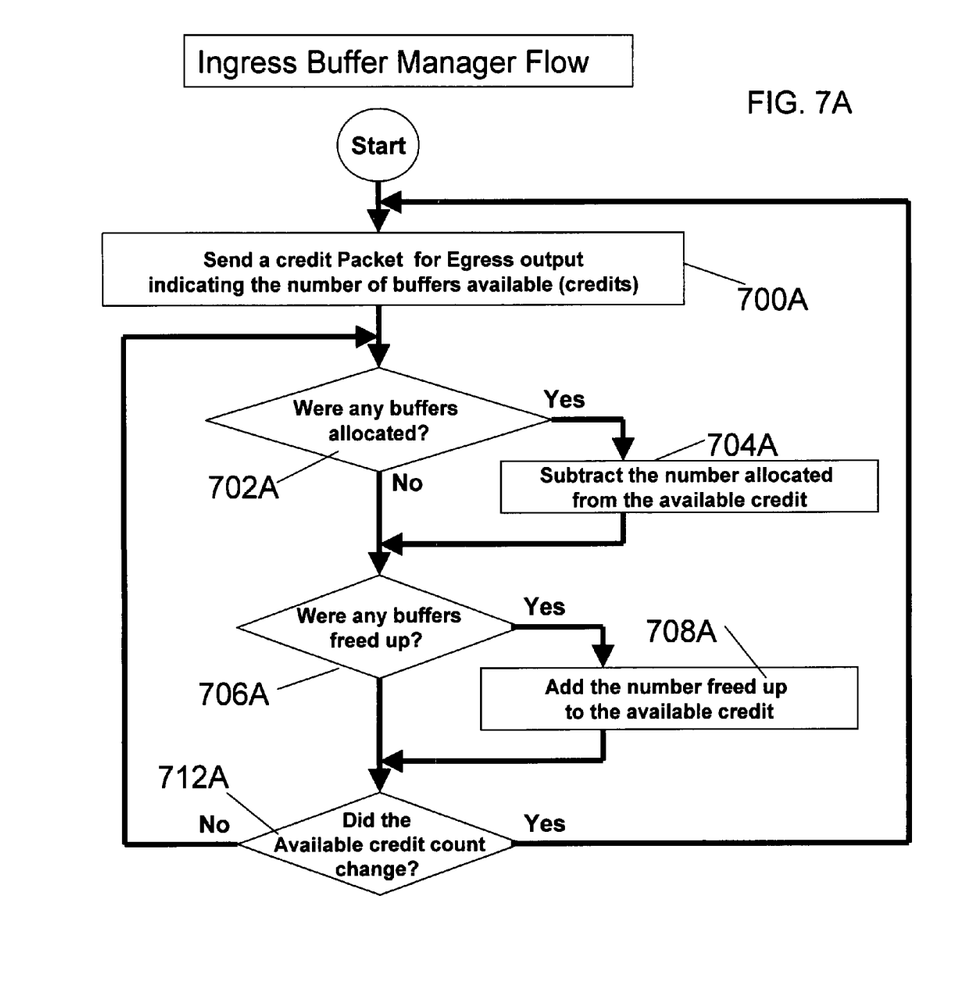
FIGS. 7A-7C are a flow diagram of an ingress control/multiplexer controller used in the end point controller of FIG. 2, FIG. 7A being a flow diagram of an ingress buffer manager used therein, FIG. 7B being a flow diagram of an ingress controller for one type of information processed therein, and FIG. 7C being a flow diagram of an ingress controller for one type of information processed therein.
Figure 7B:
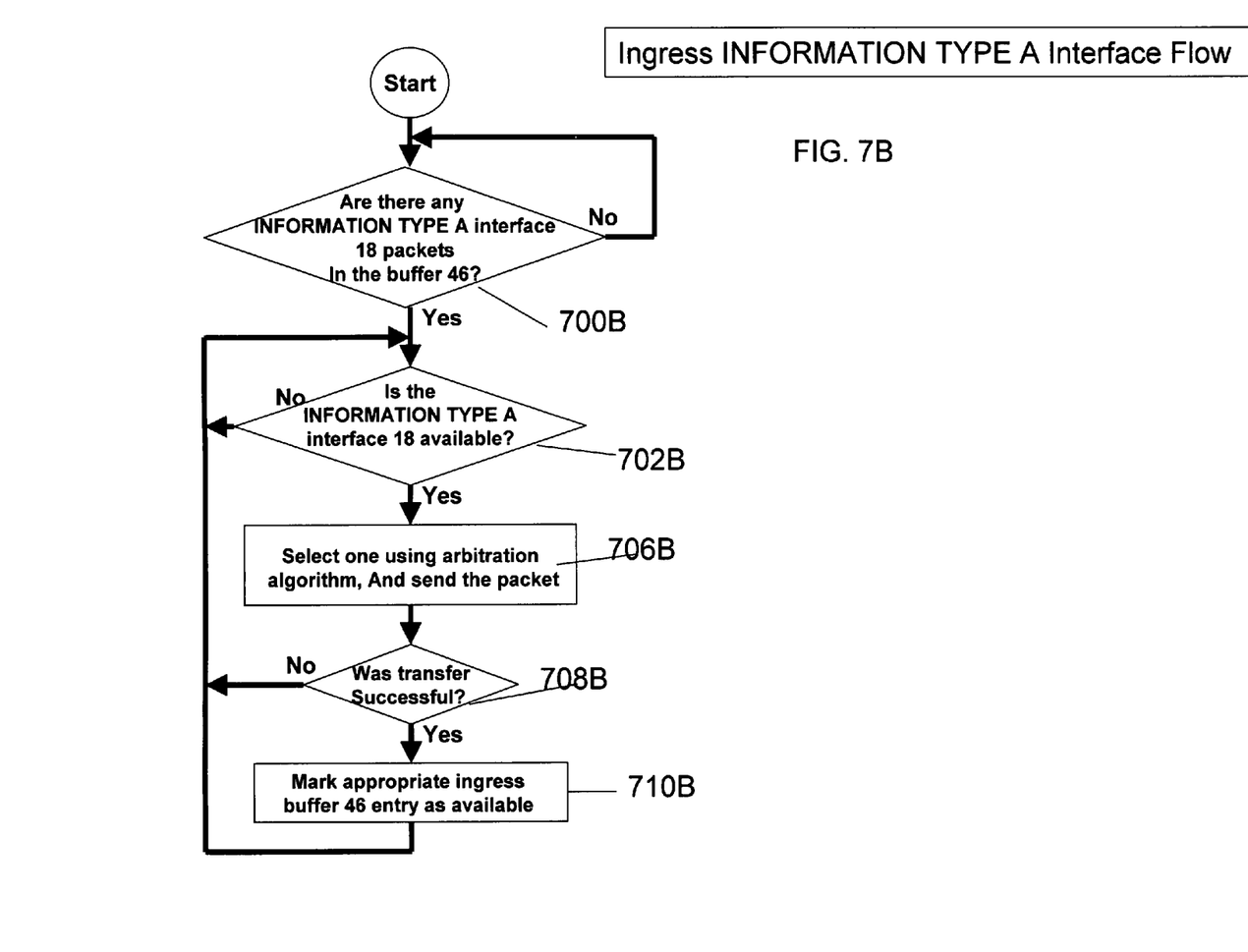
Figure 7C:
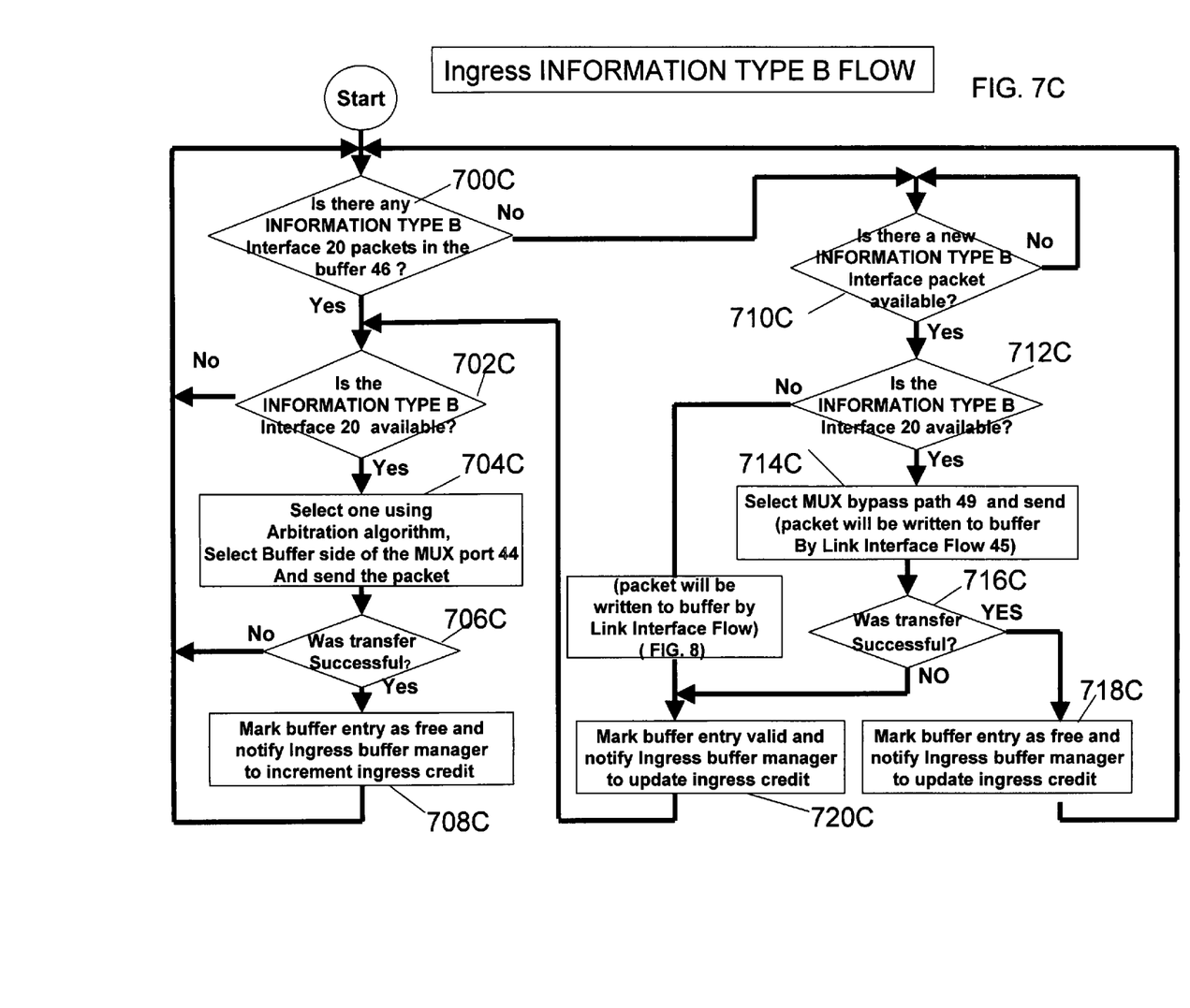

Referring now to FIGS. 7A, 7B and 7C, ingress control/mux controller 43 operational flow diagrams are shown. FIG. 7A is a flow diagram of the ingress buffer manager 43A. In Step 700A, the manager 43A sends an initial credit packet to the receiver connected to the egress port 38 (FIG. 2) via the link flow controller 45 indicating the number of ingress buffers 46 (FIG. 2) available, i.e., credits. In STEP 702A, the manager 43A determines whether any buffers 46 were allocated to newly arriving information packets. If buffers 46 were allocated, the manager 43A subtracts the number allocated from the available credits (i.e., as indicated in Step 700A), STEP 704A. Next, in STEP 706A, the manager 43A determines whether any buffers in the ingress buffer 46 (FIG. 2) previously allocated have been marked as available, i.e. freed up. If buffers were freed up, the manager 43A adds the number freed up to the available credit in STEP 708A. Next, the manager 43A determines in STEP 712A whether the credit count the newly calculated credit count is different from the previously sent value. If the credit count did change, the process returns to STEP 700A and transmits an update; on the other hand if, the credit count did not change the process returns to STEP 702A to continue monitoring.

Referring now to FIG. 7B, the flow diagram for the INFORMATION TYPE A ingress controller 43B is shown. In STEP 700B, the INFORMATION TYPE A ingress controller 43B determines whether there are any INFORMATION TYPE A packets in the ingress buffer 46. If there are, the INFORMATION TYPE A ingress controller 43B determines if the INFORMATION TYPE A interface 18 (FIG. 1) is available, STEP 702B. If it is available, the INFORMATION TYPE A ingress controller 43B selects an INFORMATION TYPE A packet in the buffer 46 using an arbitration algorithm, STEP 706B. The INFORMATION TYPE A ingress controller 43B then determines whether the transfer to the INFORMATION TYPE A interface 18 (FIG. 1) was successful, STEP 708B. If not, the process returns to STEP 702B; if successful, the INFORMATION TYPE A ingress controller 43B marks the appropriate ingress buffer 46 entry as available, STEP 710B.

Referring now to FIG. 7C, the flow diagram for the INFORMATION TYPE B ingress controller 43C is shown. In STEP 700C, the INFORMATION TYPE B ingress controller 43C determines whether there are any INFORMATION TYPE B interface 20 (FIG. 1) packets in the ingress buffer 46 (FIG. 1). If there are, the INFORMATION TYPE B ingress controller 43C determines in STEP 702C whether the INFORMATION TYPE B interface 18 (FIG. 1) is available; if not, the process returns to STEP 700C; if available, the INFORMATION TYPE B ingress controller 43C, in STEP 704C selects an INFORMATION TYPE A packet in the ingress buffer 46 using arbitration. Port 44 of multiplexer 40 (FIG. 2) is selected so that the INFORMATION TYPE B is sent to the INFORMATION TYPE B interface 20 (FIG. 1) and notifies the ingress buffer manager 43A that the buffer has been marked available, STEP 708C. The process then returns to STEP 700C.

On the other hand, if in STEP 700C the INFORMATION TYPE B ingress controller 43C determines that there are no INFORMATION TYPE B interface 20 (FIG. 1) packets in the ingress buffer 46 (FIG. 1), the INFORMATION TYPE B ingress controller 43C determines whether there is a new INFORMATION TYPE B coming into the end point controller on the I/O bus at port 39, FIG. 2, STEP 710C. If not, the process returns to STEP 700C; if there are, the INFORMATION TYPE B ingress controller 43C determines in STEP 712C whether the INFORMATION TYPE B interface 20 (FIG. 1) is available. If it is available, the INFORMATION TYPE B ingress controller 43C selects the CUT THROUGH path 43 (FIG. 2) to by-pass the ingress buffer 46 and send the packet directly to the INFORMATION TYPE B interface 20 (FIG. 1), STEP 714C. It is noted that in STEP 714C, the packet is written into the ingress buffer 46 by the link interface controller 45 to be described in more detail in connection with FIG. 8. Next, the INFORMATION TYPE B ingress controller 43C determines in STEP 716C whether the transfer was successful. If successful, the INFORMATION TYPE B ingress controller 43C marks the buffer entry as available, notifies the ingress buffer manager 43A that the buffer has been marked available, STEP 720C, and the process returns to STEP 710C; if, however, the transfer was not successful, the INFORMATION TYPE B ingress controller 43C marks the buffer entry valid in STEP 720C and the process returns to STEP 702C.

If however, in STEP 712C the INFORMATION TYPE B ingress controller 43C determined that the INFORMATION TYPE B interface 20 (FIG. 1) is not available, the link interface flow controller 45 (FIG. 2) writes the packet into the ingress buffer 46 and the INFORMATION TYPE B ingress controller 43C process proceeds with STEP 720C.

Figure 8:
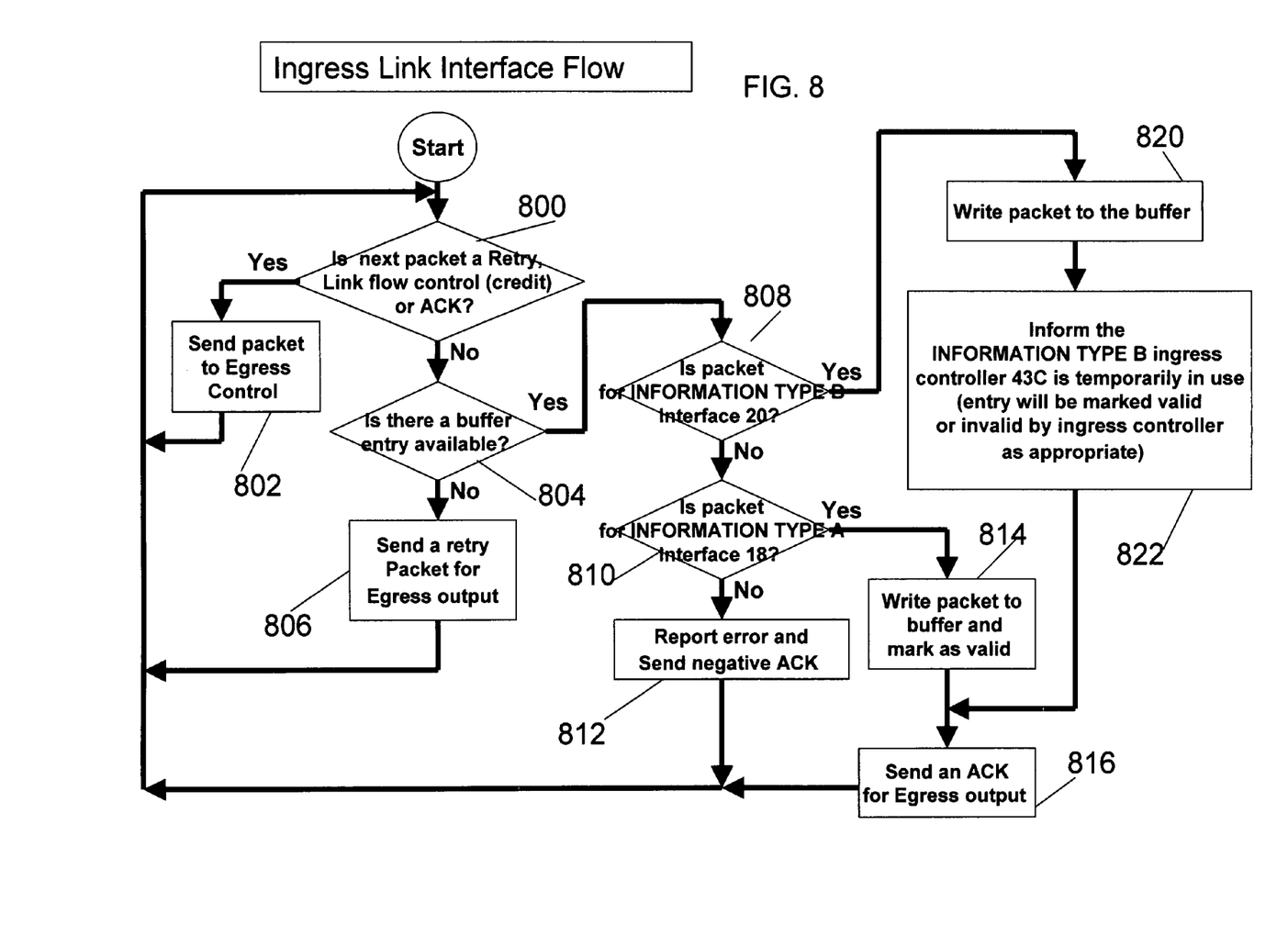
FIG. 8 is a flow diagram of a link flow controller used in the end point controller of FIG. 2.

Referring now to FIG. 8, the process for link flow controller 45 (FIG. 2) is shown. In STEP 800, the ingress link flow controller 45 determines whether the next packet at I/O port 39 (FIG. 2) is: (1) a Retry; (2) a credit, or (3) an ACK. If it is any one of these three, the packet is sent to the Egress Packet Acknowleder 41 If, in Step 800, the ingress link flow controller 45 determines that the packet is not one of these three, the ingress link flow controller 45 determines whether there is an ingress buffer entry available in the ingress buffer 46, (FIG. 2), STEP 804. If a buffer is not available, a retry packet is created and scheduled to be sent to the I/O egress port via the egress multiplexer 28, STEP 806. On the other hand, if a buffer is available, the ingress link flow controller 45 determines in STEP 808 whether the packet is destined for the INFORMATION TYPE B interface 20 (FIG. 2). If not, the ingress link flow controller 45 determines if the packet is destined for the INFORMATION TYPE A interface 18 (FIG. 1) in STEP 810. If not, the ingress link flow controller 45 a negative acknowledge packet is created and scheduled to be sent to the I/O egress port via the egress multiplexer 28, STEP 812. The process then returns to STEP 800. On the other hand, if in STEP 810, the ingress link flow controller 45 determined that the packet was for the INFORMATION TYPE A interface 18 (FIG. 1), the packet is written into the ingress buffer 46 and is marked as valid, STEP 814 and a positive acknowledge packet is created and scheduled to be sent to the I/O egress port via the egress multiplexer 28, STEP 816.

If, in STEP 808, the ingress link flow controller 45 determined that the packet was for the INFORMATION TYPE B interface 20 (FIG. 1), the ingress link flow controller 45 writes the packet into the ingress buffer 46, STEP 820. Then, the ingress link flow controller 45 notifies the INFORMATION TYPE B ingress controller 43C that the buffer entry is in use, STEP 822. It is also noted that the entry is marked as valid or invalid by the INFORMATION TYPE B interface 20 (FIG. 1) as appropriate based on CUT-THROUGH success. The process then proceeds to STEP 816, as described above.

A number of embodiments of the invention have been described. Nevertheless, it will be understood that various modifications may be made without departing from the spirit and scope of the invention. Accordingly, other embodiments are within the scope of the following claims.

What is claimed is:

1. An end point controller for a packet switching network, such network being coupled to a node through the packet switching network, such node being adapted to transmit independently to the network two different types of information packets, and to receive such two different types of information packets from the network, such end point controller comprising:

a pair of egress ports, a first one of the pair of egress ports being adapted to receive one of the pair of types of information packets and a second one of the pair of egress ports being adapted to receive the other one of the pair of types of information packets;

an I/O output port connected to the network for transmitting the information packets to the network;

a low latency buffer;

a store and forward buffer;

a multiplexer having: a first input connected to the first one of the pair of egress ports for passing information packets at the first one of the pair of egress ports to the first input through a path through the low latency buffer; a second input connected to the second one of the pair of egress ports for passing information packets at the second one of the pair of egress ports to the second input through the store and forward buffer; and a third input connected to the first one of the pair of egress ports for passing information packets at the first one of the pair of egress ports to the third input through a path by-passing the low latency buffer;

wherein information packets at the first one of the pair of egress ports are coupled to the multiplexer through both the path by-passing the low latency path and the path through the low latency buffer; and a controller coupled to the pair of egress ports for coupling a selected one of the inputs to the I/O port, such one of the inputs being selected in accordance the type of the information packets on the pair of egress ports and the availability of the end point controller to the network, the third one of the multiplexer inputs being selected if an information packet received for transmission by the end point controller is on the first one of the pair of egress inputs and the end point controller has been granted access to the network.

2. An end point controller for a packet switching network, such network being coupled to a node through the packet switching network, such node being adapted to transmit independently to the network two different types of information packets, and to receive such two different types of information packets from the network, such end point controller comprising:

a pair of egress ports, a first one of the pair of egress ports being adapted to receive one of the pair of types of information packets and a second one of the pair of egress ports being adapted to receive the other one of the pair of types of information packets;

an I/O output port connected to the network for transmitting the information packets to the network;

a low latency buffer;

a store and forward buffer;

a multiplexer having: a first input connected to the first one of the pair of egress ports for passing information packets at the first one of the pair of egress ports to the first input through a path to through the low latency buffer; a second input connected to the second one of the pair of egress ports for passing information packets at the second one of the pair of egress ports to the second input through the store and forward buffer; and a third input connected to the first one of the pair of egress ports for passing information packets at the first one of the pair of egress ports to the third input through a path by-passing the low latency buffer;

wherein information packets at the first one of the pair of egress ports are coupled to the multiplexer through both the path by-passing the low latency path and the path through the low latency buffer; and a controller coupled to the pair of egress ports for coupling a selected one of the inputs to the I/O port, such one of the inputs being selected in accordance the type of the information packets on the pair of egress ports and the availability of the end point controller to the network, the third one of the multiplexer inputs being selected if an information packet received for transmission by the end point controller is on the first one of the pair of egress inputs and the end point controller has been granted access to the network.

3. An end point controller for a packet switching network, such network being coupled to a node through the packet switching network, such node being adapted to transmit independently to the network two different types of information packets, and to receive such two different types of information packets from the network, such end point controller comprising:

a pair of egress ports, a first one of the pair of egress ports being adapted to receive one of the pair of types of information packets and a second one of the pair of egress ports being adapted to receive the other one of the pair of types of information packets;

an I/O output port connected to the network for transmitting the information packets to the network;

a low latency buffer;

a store and forward buffer;

a multiplexer having: a first input connected to the first one of the pair of egress ports for passing information packets at the first one of the pair of egress ports to the first input through a path through the low latency buffer; a second input connected to the second one of the pair of egress ports for passing information packets at the second one of the pair of egress ports to the second input through the store and forward buffer; and a third input connected to the first one of the pair of egress ports for passing information packets at the first one of the pair of egress ports to the third input through a path by-passing the low latency buffer;

wherein information packets at the first one of the pair of egress ports are coupled to the multiplexer through both the path by-passing the low latency path and the path through the low latency buffer; and a controller coupled to the pair of egress ports for coupling a selected one of the inputs to the I/O port, such one of the inputs being selected in accordance with the type of the information packets on the pair of egress ports and the availability of the end point controller to the network, the third one of the multiplexer inputs being selected if there are no packets in the low latency buffer awaiting transmission which must be transmitted first to preserve ordering of transmission from the first one of the pair of egress ports, an information packet received for transmission by the end point controller is on the first one of the pair of egress inputs and the end point controller has been granted access to the network.

4. An end point controller for a packet switching network, such network being coupled to a node through the packet switching network, such node being adapted to transmit independently to the network two different types of information packets, and to receive such two different types of information packets from the network, such end point controller comprising:

a pair of ingress ports, a first one of the pair of ingress ports being adapted to receive one of the pair of types of information packets and a second one of the pair of ingress ports being adapted to receive the other one of the pair of types of information packets;

an I/O input port connected to the network for receiving the information packets from the network;

a single I/O receive buffer with a pair of buffer outputs, buffer entry availability being used to determine granting access from the network, and for storing both types of information packets, each one of the types of information packets being presented at each one of the pair of buffer outputs;

the second one of the pair of buffer outputs being connected to the second one of the pair of ingress ports;

a multiplexer having: a first input connected to the first one of the pair of buffer outputs for passing information packets to the first one of the pair of ingress ports; and a second input connected to the I/O input port for passing information packets to the first one of the pair of ingress ports, by-passing the I/O receive buffer;

wherein information packets at the first one of the pair of ingress ports are presented from the multiplexer through either the path by-passing the I/O receive buffer or the path through the I/O receive buffer; and a pair of controllers, each coupled to a one of the pair of ingress ports;

the first of the pair of controllers selecting for input a second one of the multiplexer paths if there are no packets in the I/O input buffer awaiting receipt which must be received first to preserve ordering of receipt to the first one of the pair of ingress ports, and an information packet presented on the I/O input port; else selecting for input the first one of the multiplexer paths if there is a packet in the I/O input buffer awaiting receipt by the first one of the pair of ingress ports;

the second of the pair of controllers selecting for receipt by the second of the pair of ingress ports if there is a packet in the I/O input buffer awaiting receipt by the second one of the pair of ingress ports.

* * * * *